United States Patent [19]

Coddens

[11] Patent Number: 4,869,527
[45] Date of Patent: Sep. 26, 1989

[54] VEHICLE WHEEL ALIGNMENT DEVICE

[76] Inventor: Douglas W. Coddens, 924 Canterbury Dr., South Bend, Ind. 46614

[21] Appl. No.: 196,812

[22] Filed: May 18, 1988

Related U.S. Application Data

[63] Continuation-in-part of Ser. No. 75,197, Jul. 17, 1987, abandoned, which is a continuation of Ser. No. 930,039, Nov. 11, 1986, abandoned, which is a continuation of Ser. No. 821,506, Jan. 1, 1986, abandoned, which is a continuation of Ser. No. 598,504, May 9, 1984, abandoned.

[51] Int. Cl.$^4$ ............................................... B62D 17/00
[52] U.S. Cl. .................................... 280/663; 280/661; 280/673
[58] Field of Search ............... 280/661, 670, 673, 663, 280/666, 696

[56] References Cited

U.S. PATENT DOCUMENTS

| | | | |
|---|---|---|---|
| 3,368,824 | 2/1968 | Julien | 280/666 |
| 3,880,444 | 4/1975 | Bridges | 280/661 |
| 4,057,120 | 11/1977 | Roethlisberger | 280/661 |
| 4,192,396 | 3/1980 | Austermann, Jr. et al. | 280/663 |

Primary Examiner—Charles A. Marmor
Assistant Examiner—Ross Weaver
Attorney, Agent, or Firm—James D. Hall

[57] ABSTRACT

A vehicle wheel alignment device for adjusting the camber of a wheel carried at one end of a lateral suspension member, such as an I-beam of a twin I-beam suspension. The invention includes apparatus for connecting the opposite end of the lateral member to a vehicle frame member whereby the inner end of the lateral member can be raised or lowered to alter the tow in of the wheel.

4 Claims, 10 Drawing Sheets

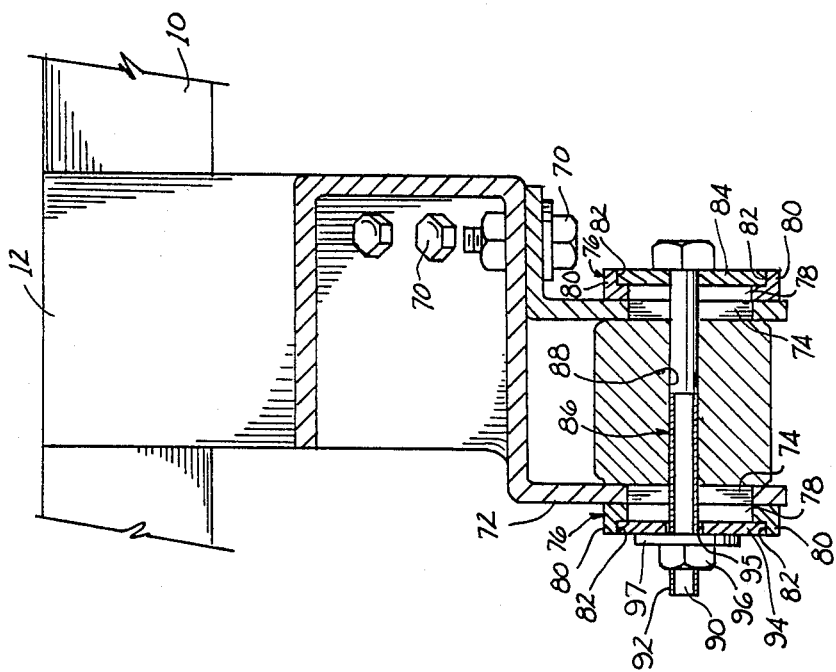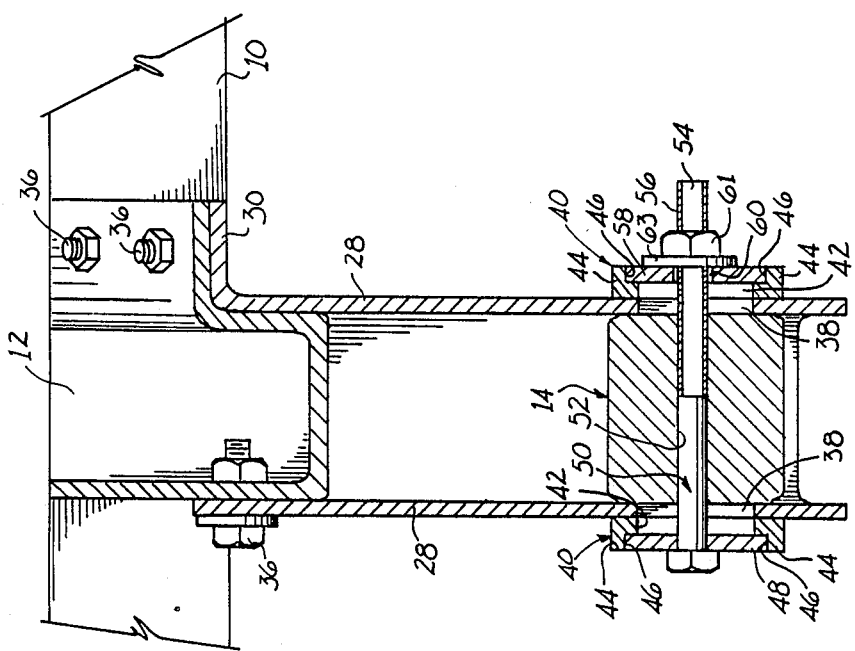

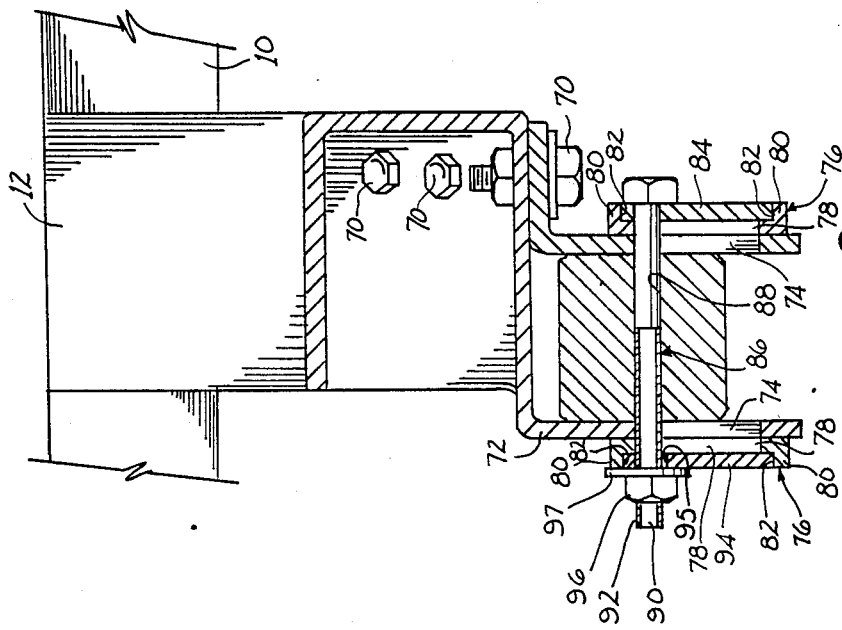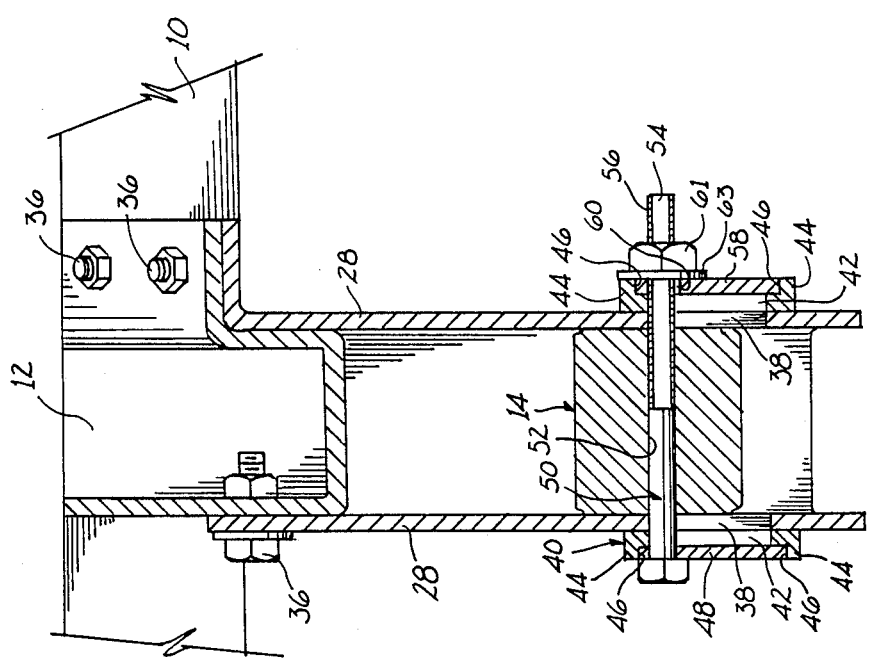

VEHICLE WHEEL ALIGNMENT DEVICE

This is a continuation-in-part of co-pending application Ser. No. 07/075,197 filed on July 17, 1987, now abandoned, which is a continuation of co-pending application Ser. No. 06/930,039 filed on Nov. 11, 1986, now abandoned, which is a continuation of co-pending application Ser. No. 06/821,506 filed on Jan. 1, 1986, now abandoned, which is a continuation of co-pending application Ser. No. 06/598,504 filed on May 9, 1984, now abandoned.

SUMMARY OF THE INVENTION

This invention relates to a vehicle wheel alignment device.

In vehicles having a suspension system commonly known as a twin I-beam suspensions, alignment of the wheels has been difficult, costly to the owner of the vehicle, and time consuming for the person doing the alignment. The major reason for this is that in such a suspension system, the front axle camber adjuster bushing must be removed and replaced to correct the camber setting. The bushings are relatively expensive and it is time consuming and laborious to remove one bushing and replace it with another, especially if rust and corrosion are present.

It is an object of this invention to provide a novel and useful vehicle wheel alignment device.

Another object is to provide a vehicle wheel alignment which eliminates the necessity of removing an adjustment bushing and replacing it in the alignment process for a twin I-beam suspension.

Another object is to provide a vehicle wheel alignment device which provides for movement of the inner end of each I-beam of a twin I-beam suspension during the alignment procedure.

Another object is to provide a vehicle wheel alignment device which reduces the time and cost of alignment of wheels mounted to a twin I-beam suspension.

Another object is to provide a vehicle wheel alignment device which may be used to adjust the camber of wheels mounted to a twin I-beam suspension through the movement of the inner end of each I-beam.

Another object is to provide for a vehicle wheel alignment device which improves tire wear and vehicle handling performance.

BRIEF DESCRIPTION OF THE DRAWINGS

FIG. 5 is a sectional view taken along line 5—5 of FIG. 3.

FIG. 6 is a sectional view taken along line 6—6 of FIG. 3.

FIG. 7 is a sectional view taken along line 7—7 of FIG. 4.

FIG. 8 is a sectional view taken along line 8—8 of FIG. 4.

DESCRIPTION OF THE PREFERRED EMBODIMENT

Figure 1:
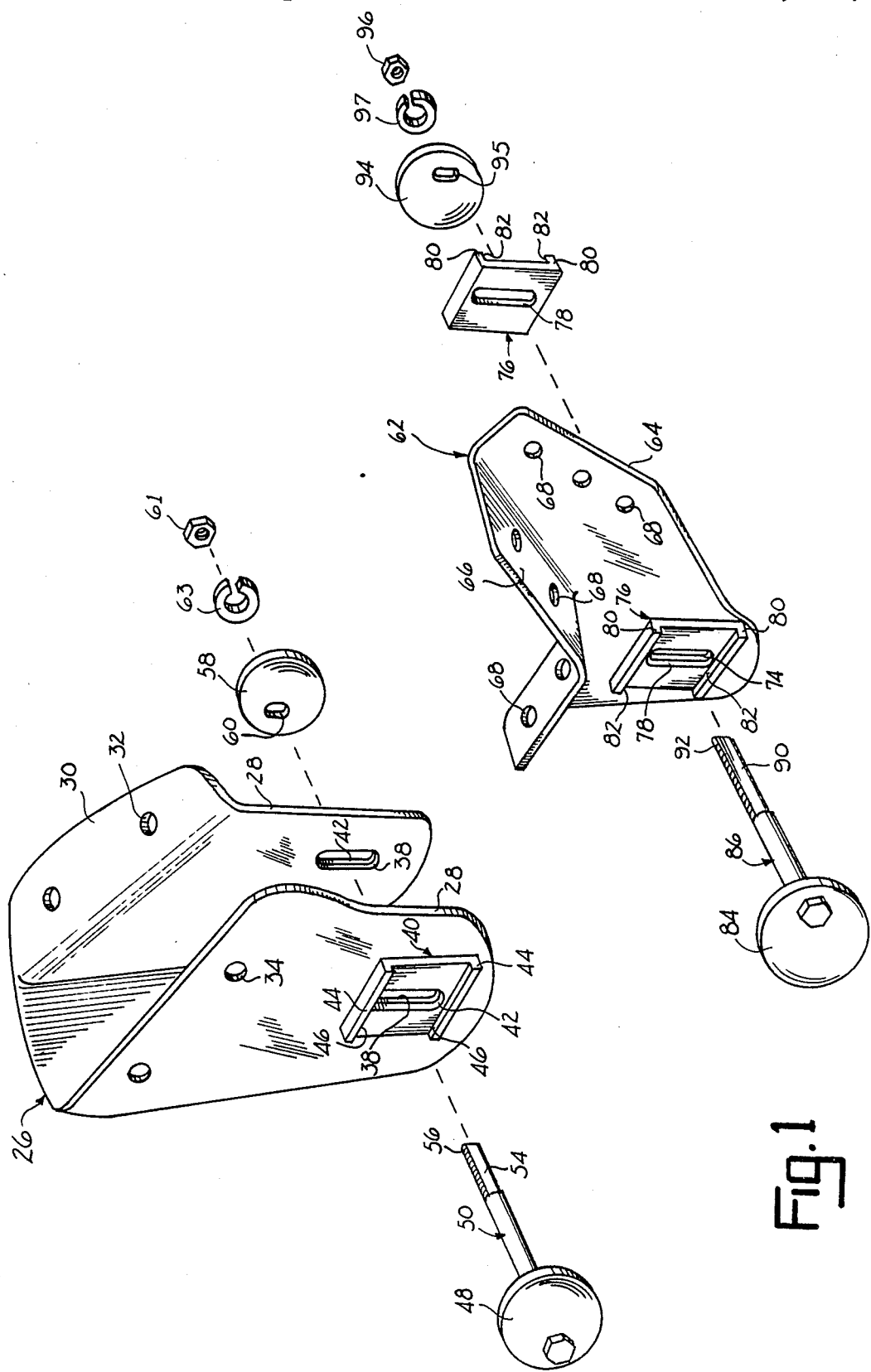
FIG. 1 is an exploded perspective view of the vehicle wheel alignment device of this invention.
Figure 2:
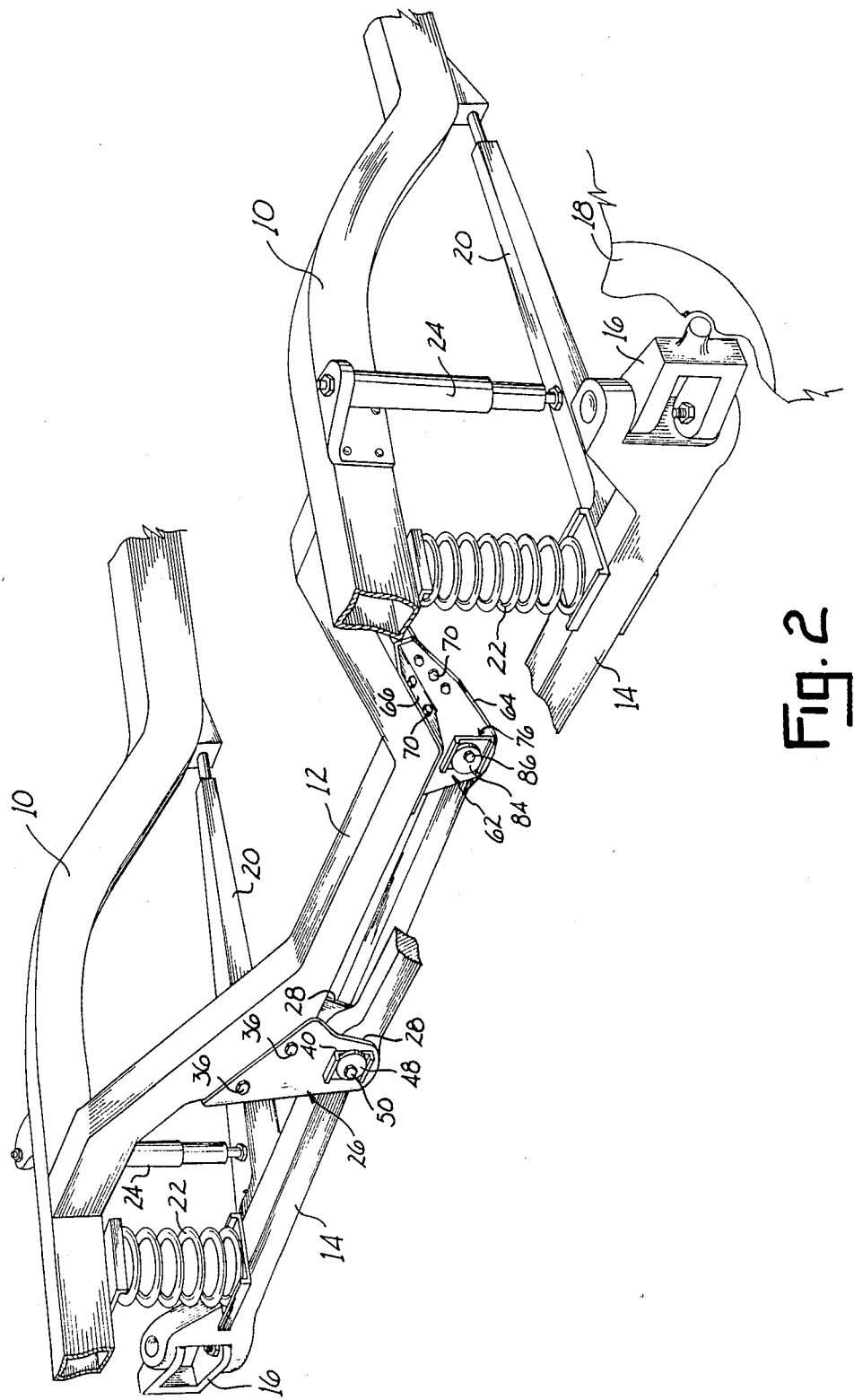
FIG. 2 is a perspective view of a twin I-beam suspension wheel with portions broken away to illustrate the mount of the alignment device of FIG. 1 thereto.

The preferred embodiments illustrated are not intended to be exhaustive or to limit the invention to the precise forms disclosed. They are chosen and described in order to explain the principles of the invention and its application and practical use to thereby enable others skilled in the art to utilize the invention.

The alignment of this invention is applicable to a vehicle suspension having spaced longitudinal frame members 10 joined adjacent their forward ends by a cross member 12. The vehicle suspension also includes lateral members 14, known as I-beams, pivotally connected at their inner ends to cross member 12. The outer end of each lateral member 14 carries a spindle 16, or steering knuckle, to which a wheel 18 is rotatively mounted. Radius arms 20 are each journaled at one end to a respective longitudinal frame member 10 and connected at the other end to a respective lateral member 14 adjacent its connected spindle 16. A spring 22 is positioned between each longitudinal frame member 10 and lateral member 14 to absorb motion between the lateral member and the longitudinal frame member. A shock absorber 24 is connected between each longitudinal frame member 10 and its associated radius arm 20 to assist in absorption of relative motion between the radius arm, lateral member 14 and the longitudinal frame member.

The wheel alignment device of this invention includes a U-shaped bracket 26 having spaced wall parts 28. One of the wall parts 28 has an out-turned flange 30 at its upper end having openings 32 formed in it. The other wall part 28 of bracket 26 has openings 34 formed in its upper end. Bracket 26 is connected to suspension cross member 12 with bolts 36 which pass through openings 32, 34 and similar, aligned openings formed in the cross member. The inner end of a lateral member 14 extends into bracket 26 between its wall parts 28. A vertical slot 38 is formed in each bracket wall part 28. A plate 40 having a similar slot 42 is secured to each wall part so that slot 42 is aligned with a slot 38. Each plate 40 includes upper and lower out-turned flanges 44 which form opposed bearing surfaces 46.

An annular adjustment member 48 is positioned between flanges 44 of one plate 40. A bolt 50 extends eccentrically through adjustment member 48 with the adjustment member being secured to the bolt for rotation with the bolt. Bolt 50 extends through slot 42 of one plate 40, slot 38 of one wall part 28, through a bore 52 formed in the inner end of the bracket interfitting lateral member 14, slot 38 in the other wall part 28, and slot 42 formed in the other plate 40. Bolt 50 has flats 54 formed at its threaded end 56. Another annular adjustment member 58 having an eccentrically located slot 60 is fitted over threaded end 56 of bolt 50 so that flats 54 bear against the sides of slot 60 in non-rotative relation to the annular member. Annular adjustment member 58 is received between out-turned flanges 44 of the other plate 40. A nut 61 is turned onto the threaded end 56 of bolt 50 and is tightened against a lock member 63 as shown in FIG. 5, to draw annular members 48 and 58 against plates 40. Annular members 48 and 58 have the same orientation relative to the axis of bolt 50 and fit snugly between surfaces 46 of plate flanges 44.

In the particular embodiment illustrated in FIGS. 1-8, a second bracket 62 having a wall part 64 and an out-turned flange 66 is utilized in the mounting of the other lateral member 14 of the vehicle suspension. Openings 68 are formed in out-turned flange 66 and wall part 64 and are alignable with openings (not shown) in cross member 12 so that bolts 70 may be passed through such aligned openings for securement of bracket 62 to the cross member, as shown in FIGS. 6 and 8. Bracket 62 is positioned across from a down-turned strengthening part 72 of cross member 12. The inner end of the other lateral member 14 extends between bracket wall part 64 and cross member down-turned part 72 has a slot 74 formed in it. A plate 76 having a slot 78 is secured to each of wall part 64 and down-turned part 72 part 72 with its slot 78 aligned with a slot 74. Each plate 76 has upper and lower out-turned flanges 80 which form opposed bearing surfaces 82. An annular adjustment member 84 having a bolt 86 extending eccentrically through it is received between flanges 80 of one plate 76. Bolt 86 is secured to annular member 84 and extends through slot 78 of one plate 76, slot 74 formed in bracket wall part 64, a bore 88 formed in the inner end of the interfitting lateral member 14, slot 74 of down-turned part 72, and slot 78 of the other plate 76. Bolt 86 has flats 90 formed at its threaded end 92. Another adjustment member 94, having an eccentrically located slot 95 formed in it, is fitted over threaded end 92 of bolt 86 in non-rotative relation and is received between out-turned flanges 80 of the other plate 76. A nut 96 is turned onto threaded end 92 of bolt 86 and tightened against a lock washer 97 to draw annular members 84 and 94 against plates 76. Annular adjustment members 84 and 94 have the same orientation relative to the axis of bolt 86 and fit snugly between surfaces 82 of plate flanges 80.

Figure 3:
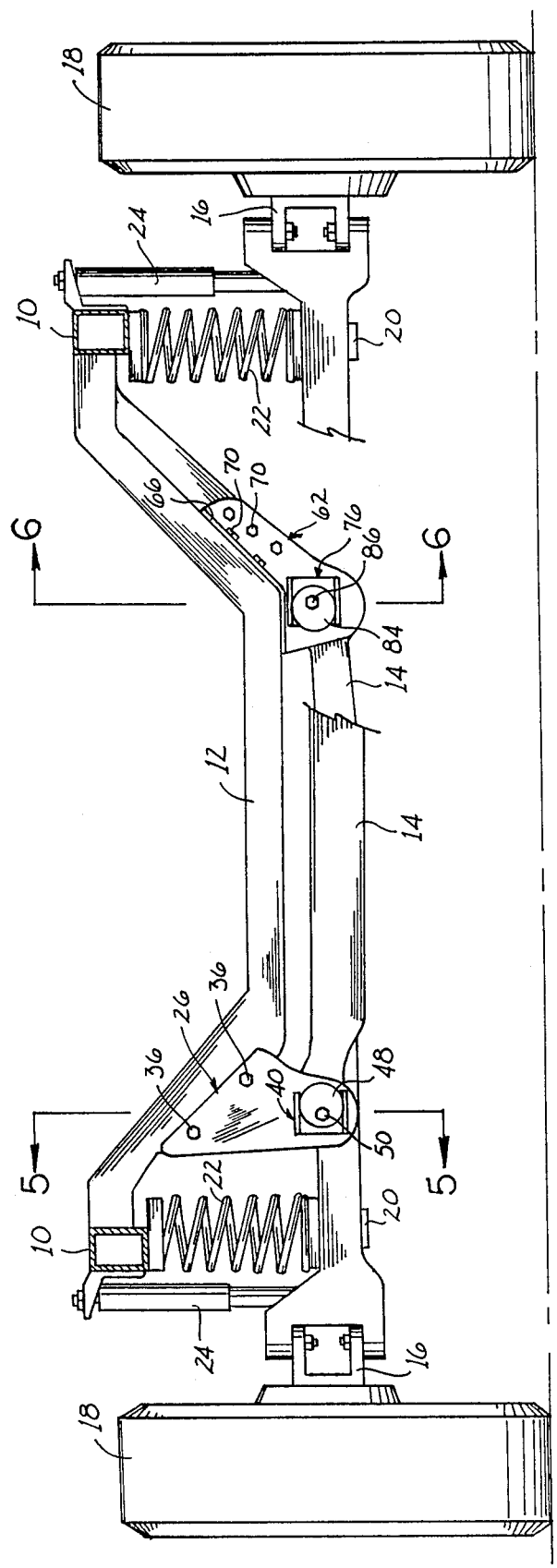
FIG. 3 is a front view of the twin I-beam suspension of FIG. 2 showing the wheels in zero camber position and having portions broken away for illustration.
Figure 4:
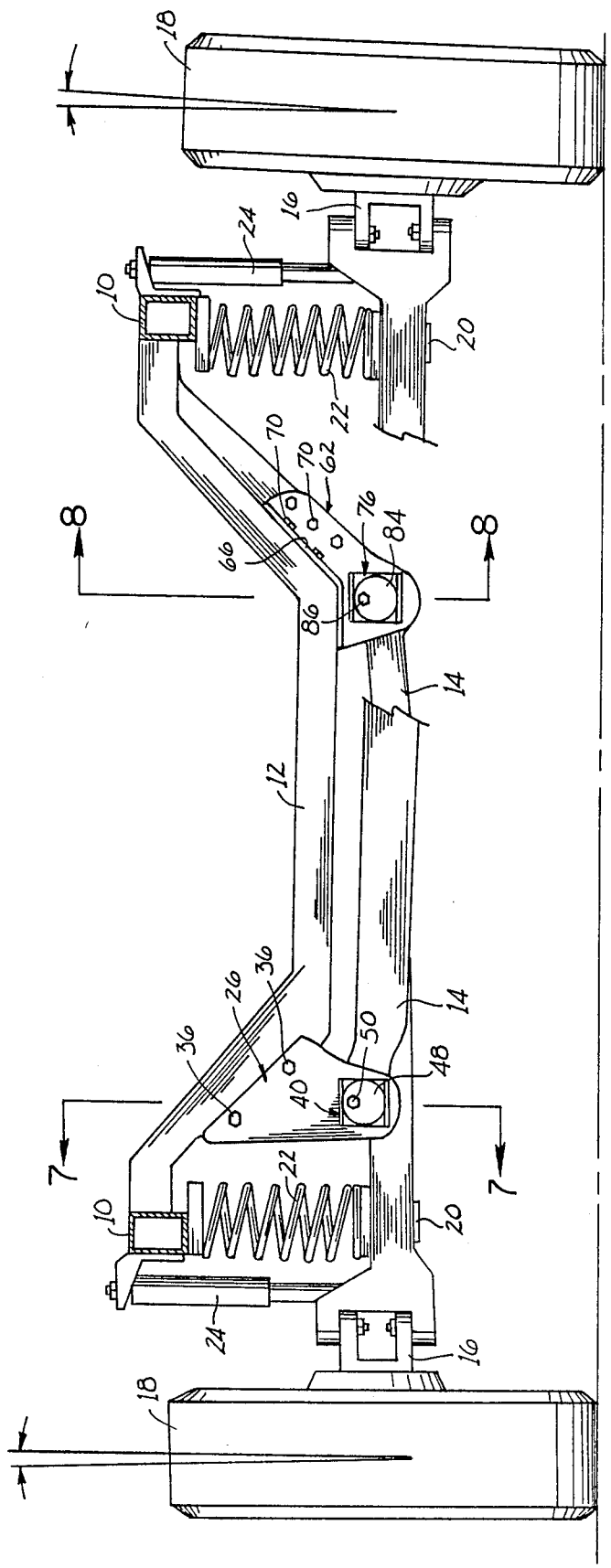
FIG. 4 is a front view of the twin I-beam suspension showing adjustment of the alignment device to a maximum positive camber position and having portions broken away for purposes of illustration.

In the operation of the alignment device illustrated in FIGS. 1-8, the loosening of respective nuts 61, 96 and the turning of respective bolts 50, 86 causes the eccentric rotation of annular members 48, 58, 84, 94, and the resulting vertical movement of the bolts relative to plates 40, 76 to cause the raising or lowering of the inner ends of the connected lateral members 14, as illustrated in FIGS. 5-8. This in turn changes the camber of wheels 18 as illustrated in FIGS. 3 and 4.

In a vehicle having an ordinary twin I-beam suspension with a fixed end beam-to-frame pivot connection as the vehicle frame jounces up the camber of the vehicle's wheels naturally increases with only a slight increase in toe-out. This causes outside tire wear. During rebound of the ordinary vehicle frame, camber of the vehicle's wheels is decreased with a slight increase in toe-in. This causes inside tire wear. In the subject invention, the toe geometry of the wheel during jounce up and rebound substantially increases in toe-out and toe-in respectively. By so changing the toe geometry during jounce up and rebound, the vehicle's tires ride more on center and thus show a more desirable wear pattern.

Figure 12:
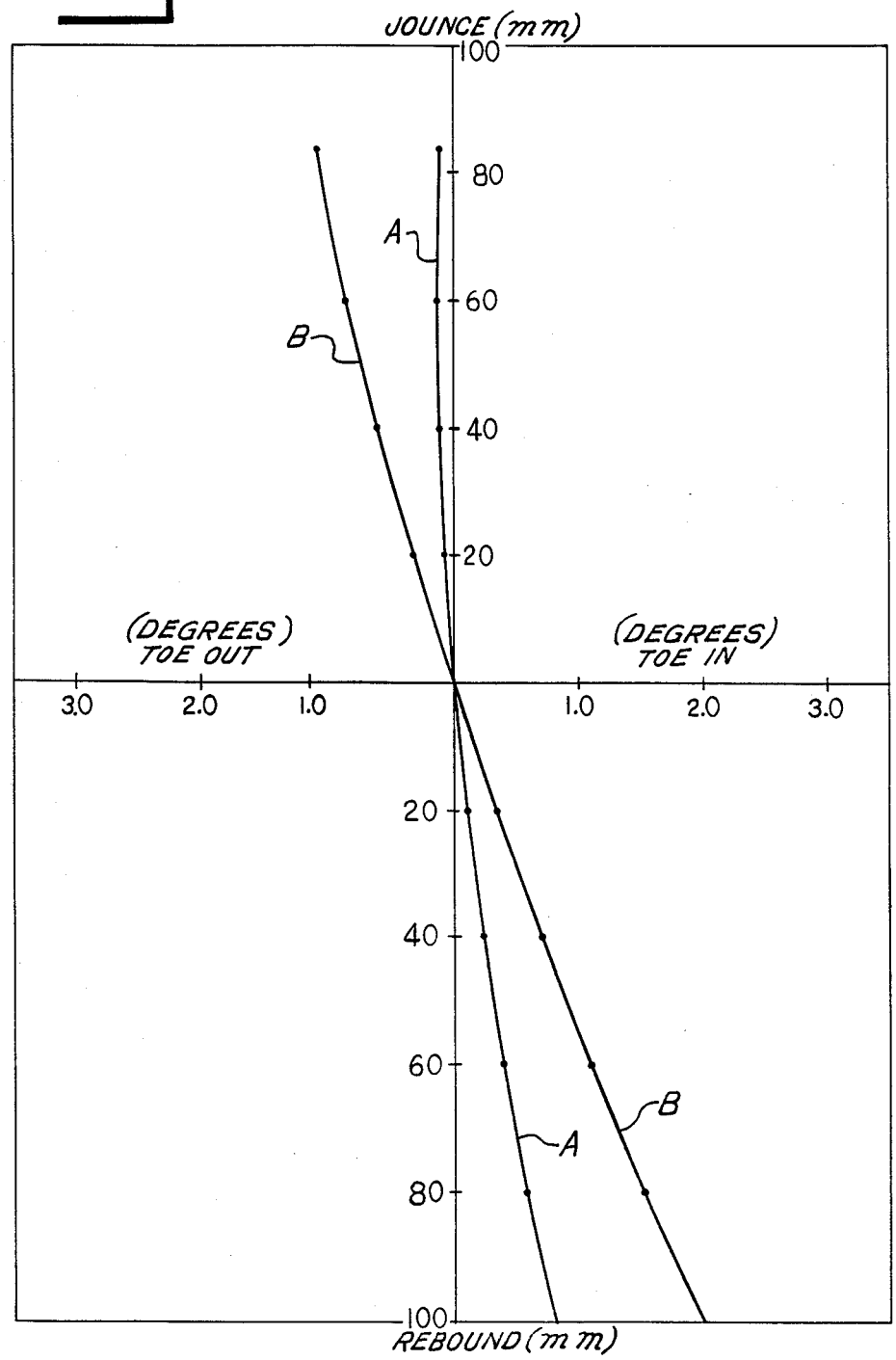
FIG. 12 is a graph of Toe Change in Degrees VS KSI Travel in MM for an original vehicle and a modified vehicle.

To illustrate the above described geometrical change of the vehicle's wheels during jounce up and rebound, the graph of FIG. 12 is included. This graph is representative of actual test results. Line A of FIG. 12 represents changes in toe of a vehicle which has an ordinary twin I-beam suspension during an upward jounce of approximately 84 mm and a downward rebound of approximately 100 mm. Line B of FIG. 12 represents changes in toe of a vehicle which had its twin I-beam suspension modified in accordance with this invention and as shown in FIGS. 1-8 during a similar upward jounce and downward rebound. This approximate 1° increase in toe out during an upward jounce with a resulting increase in camber and an approximate 1° increase in toe-in during downward rebound with a resulting decrease in camber causes the tire to ride more on center, thus decreasing outside tire wear.

Figure 9:
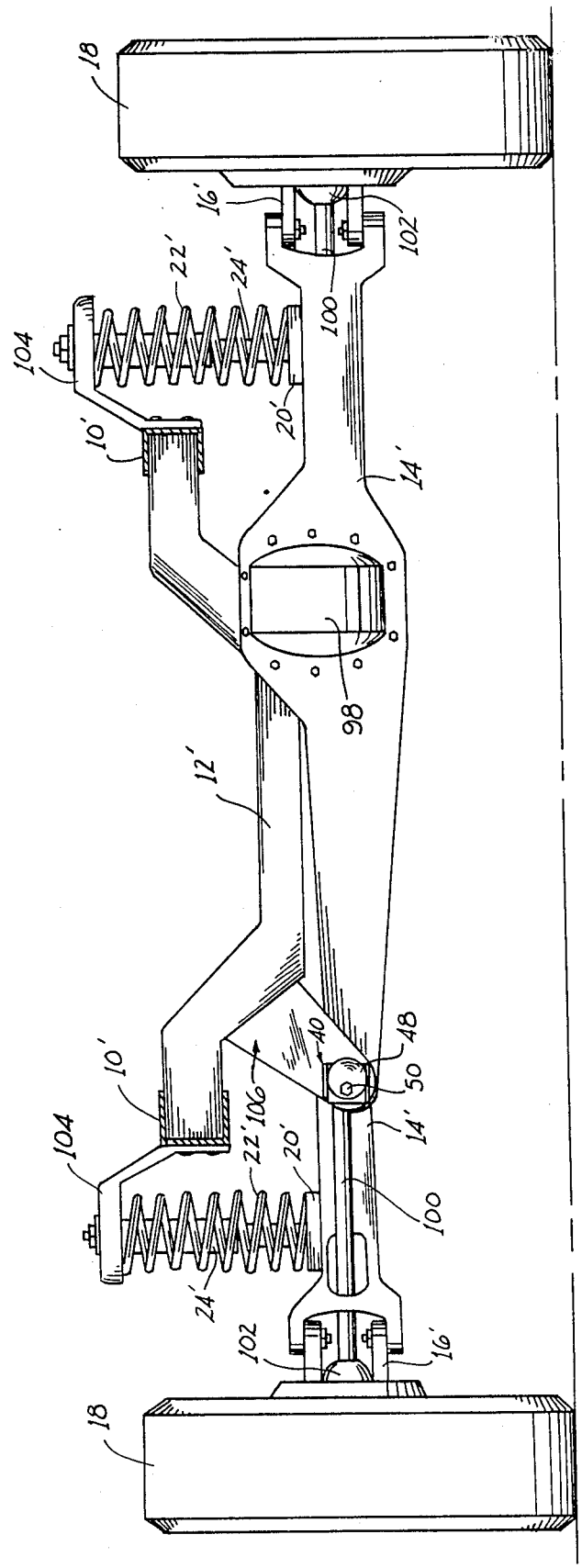
FIG. 9 is a front view of a twin I-beam suspension in a four-wheel drive, or front wheel drive, configuration and illustrating the use of a wheel alignment device of this invention.
Figure 10:
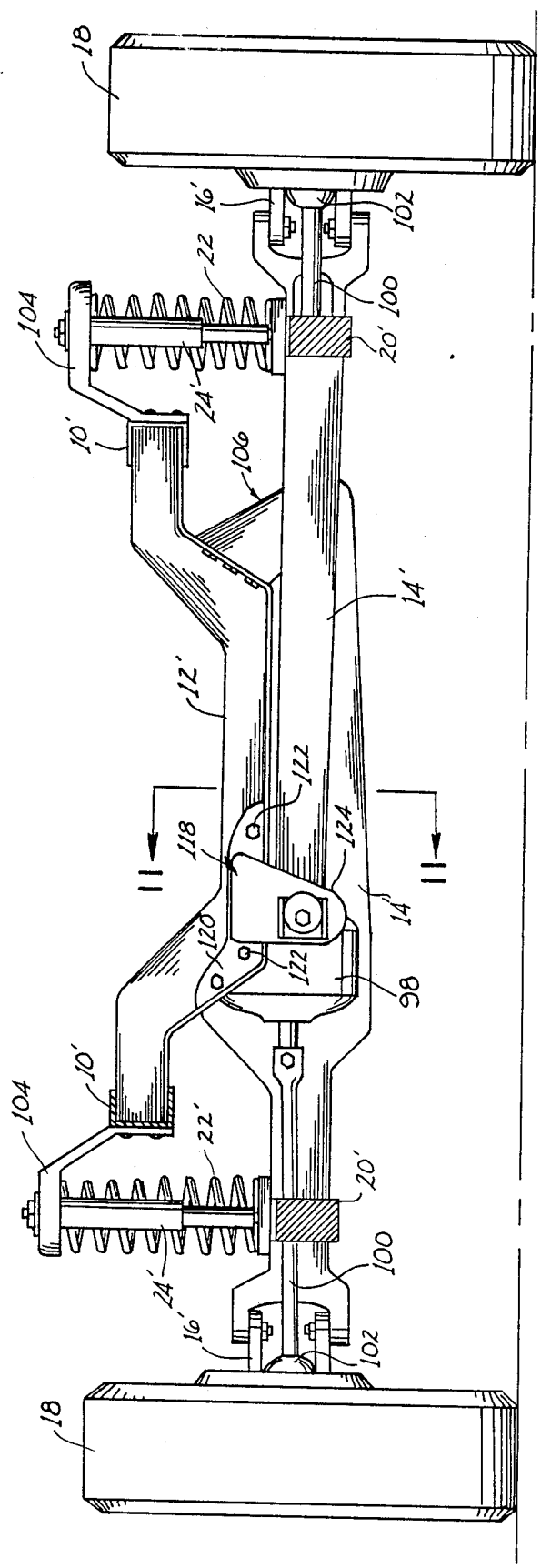
FIG. 10 is a rear view of the suspension of FIG. 9.
Figure 11:
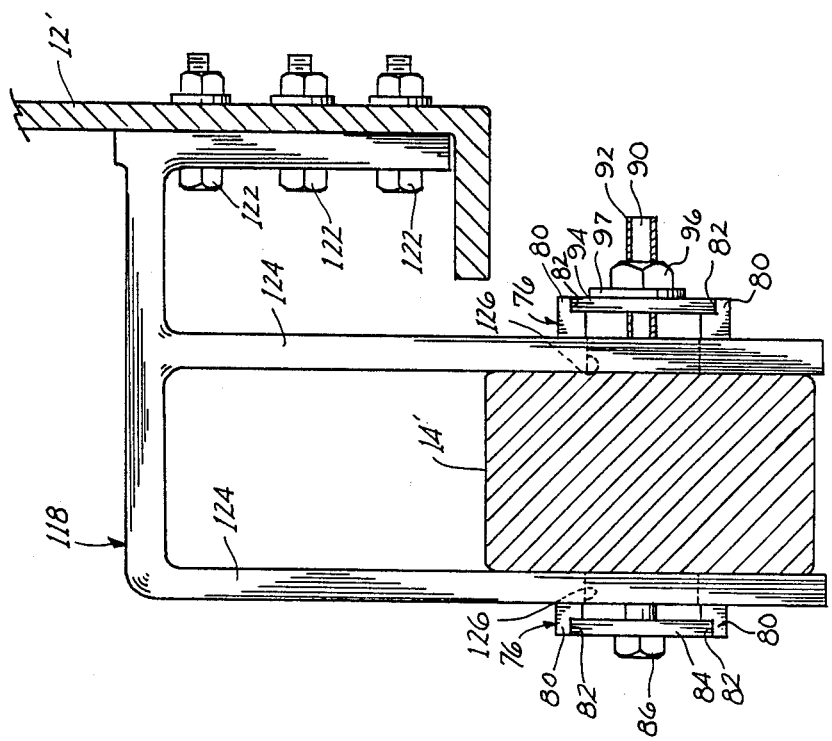
FIG. 11 is a fragmentary sectional view taken along line 11—11 of FIG. 10.

An adaptation of the wheel alignment device to a vehicle suspension for a four-wheel drive unit is shown in FIGS. 9-11. This suspension includes longitudinal frame members 10' which are joined adjacent their forward ends by a cross member 12'. The four-wheel drive suspension includes lateral members 14' pivotally connected at their inner ends to cross member 12'. A spindle 16', or steering knuckle, is carried at the outer end of each lateral member 14'. A wheel 18 is mounted upon each spindle 16'. A radius arm 20' is connected at one end to each frame member 10' and at its other end to a corresponding lateral member 14' adjacent its spindle 16'. One of lateral members 14' includes a centered differential housing 98. The differential housing 98 carries drive gears (not shown) which are connected to the transmission (not shown) for the engine of the vehicle. Drive shafts 100 are also connected to the drive gears within housing 98 and extend from each side of the differential housing. Each shaft 100 is joined at its distal end through a universal joint 102 to a wheel 18. A shroud 104 is fastened to each longitudinal member 10'. A spring 22' and shock absorber 24' are mounted between each shroud 104 and a lateral member 14' to regulate the vertical pivotal movement of each lateral member 14'.

The alignment device of this invention includes a bracket 106 which is very similar in shape to bracket 26 described above for the embodiment of FIGS. 1-8. Bracket 106 includes spaced wall parts 108 which receive the inner end of a lateral member 14'. Each wall part has a vertical slot 126 formed in it.

Bracket 106 has associated therewith plates 40, annular adjustment members 48, 58, bolt 50 and fastening nut 60 in a manner similar to that for bracket 26 whereby the inner end of lateral member 14' is mounted between wall parts 108. The inner end of lateral member 14' is vertically adjustable by operation of the parts in a manner similar to that described for the parts of the first embodiment.

A second bracket 118, shown in FIGS. 10 and 11, is used to mount the inner end of the other lateral member 14' to cross member 12'. Bracket 118 includes a mounting plate 120 having bores formed therein to align with similar bores formed in cross member 12' so that bracket 118 may be secured to the cross member with bolts 122. Bracket 118 is preferably a cast piece and includes a spaced down-turned wall parts 124. Each wall part 124 has a vertical slot 126 formed in it. Plates 76, annular adjustment members 84, 94, bolt 86 and a fastening nut 96 are associated with wall parts 124 to retain an inner end of a lateral member 14' between the wall parts.

Adjustment of the camber of wheels 18 shown in FIGS. 9-11 as accomplished in a manner identical to that described above for the first embodiment of the wheel alignment device.

It is to be understood that the invention is not to be limited by the terms of the above description but may be modified within the scope of the appended claims.

I claim:

1. In combination, a vehicle suspension including a frame having a cross member, a lateral member mounted to said frame and having a spindle for supporting a wheel at one end, and means connecting the other end of said lateral member to said cross member for adjusting the vertical position of said lateral member other end relative to said cross member to cause adjustment in camber of said wheel with an associated increase in tow out of the wheel during jounce and an associated increase in tow in of the wheel during rebound of the vehicle suspension, whereby the vehicle's tires ride more on center and thus show a more desirable wear pattern.

2. The combination of claim 1 wherein a pin extends through each lateral member other end and protrudes therefrom at its ends, cam means associated with said pin ends for selectively raising and lowering said lateral member other end.

3. The combination of claim 1 wherein each adjustment means includes spaced opposed wall parts mounted to said cross member and having aligned slots formed therein, a pin member connected to each lateral member other end and extending at its ends through said slots, and fasteners connected to said pin member ends to position the pin member ends within said slots.

4. The combination of claim 3 and an annular member eccentrically carried by each end of each pin, each annular member received between and guided by bearing surfaces mounted on a said wall part, whereby rotation of said annular member causes alteration of the vertical height of said pin connected lateral member other end.

* * * * *